Feb. 5, 1957 B. G. CARLSON ET AL 2,780,104
GYROSCOPE CONTROL SYSTEM

Filed March 3, 1953 2 Sheets-Sheet 1

INVENTORS
Bert G. Carlson
Albert L. Judson

BY

AGENT

INVENTORS
Bert G. Carlson
Albert L. Judson

AGENT

United States Patent Office 2,780,104
Patented Feb. 5, 1957

2,780,104

GYROSCOPE CONTROL SYSTEM

Bert G. Carlson, Van Nuys, Calif., and Albert L. Judson, Portland, Oreg., assignors to Iron Fireman Manufacturing Company, a corporation of Oregon Application March 3, 1953, Serial No. 340,102

10 Claims. (Cl. 74—5.43)

This invention relates generally to gyroscopes and more particularly to gyroscopes which at certain critical times must be rendered free and nonpendulous but which at other times are required to maintain themeselves in a precise gravity vertical position.

It is well known that gyroscopes have come to be essential elements of the control systems required for the operation of navigation and ordnance equipment of military airplanes. For certain purposes the gyroscope is useful just in so far as it will maintain a true gravity vertical reference axis as a basis for the control of such equipment.

It is also well known that many forces both inherent and external are continuously acting to displace the gyroscope from its reference position and that all possible effort must be made to eliminate the errors resulting therefrom.

The present invention is particularly adapted for use in the control systems of military airplanes for it is a principal object of this invention to provide means quickly to release the gyroscope to a free non-pendulous condition when a maneuver involving acceleration of the airplane is started and to restore the gyroscope to its control function at the end of the accelerated movement of the plane.

It is a second and important object of this invention to provide means while the gyroscope is engaged in its control functions to continuously restore the gyroscope to its true gravity vertical as it is continuously displaced therefrom by the many forces acting upon it.

It is a third object to provide an improved air erection system for a gyroscope having a rotor freely spinning about a spin axis in a support or case, the support being mounted in a gimbal ring freely to rotate in either direction about two mutually perpendicular axes, one of which axes is normal to and lies in the plane of the spin axis of the gyroscope, and all three of said axes being positioned to intersect one another at a common point.

It is a fourth object to provide an improved air erection system for such a gyroscope having a spin axis required to be maintained precisely at the gravity vertical, in which system the divergence of the spin axis from the gravity vertical by movement of the spin axis in either direction of rotation about either of the two mutually perpendicular gimbal axes results in the gravitational movement of a ball valve away from a valve port through which gas under pressure will be admitted to a gas jet opening from the support to exert a reaction force on the support in a direction to cause the spin axis to be precessed to the gravity vertical about the gimbal axis of displacement and in a direction opposite to its rotation of displacement.

It is a fifth object to provide an air erection system having an individual ball valve, valve port and gas jet erecting means for each of the four freedoms of displacement of the spin axis about the two gimbal axes.

It is a sixth object to provide means for maintaining each of said valve balls in a frictionless freely balanced or pivotal condition by directing to the under side of each ball a pair of gas streams one of the streams being positioned on the spin axis side of the supporting or pivot position of the ball and the other of the streams being positioned on the side of the pivot position of the ball away from the spin axis.

It is a seventh object to provide means carried on the gyroscope rotor and adapted to spin therewith to provide gas under pressure to be used to restore the gyroscope to its true gravity vertical.

It is an eighth object to provide in the gyroscope case or support four air jets equally spaced in a plane normal to the spin axis of the gyroscope for the purpose of emitting gas, the reaction of said gas emission being adapted to provide the force required to control precession of the gyroscope to its gravity vertical.

It is a ninth object to provide four radial and substantially cylindrical gas valve chambers equally spaced in the gyroscope case with their axes in a plane normal to the spin axis, two of said chambers having their axes in a plane including both the spin axis and one gimbal axis and two of said chambers having their axes in a plane including the spin axis and normal to said one gimbal axis.

It is a tenth object to provide in the gyroscope case a gas plenum chamber in which the pressure of the gas will become equalized before being discharged from the several gas discharge parts therein.

It is an eleventh object to provide in each of the horizontal radial cylindrical gas valve chambers a metal ball having nearly the same diameter as the chamber but free to roll longitudinally a measurable distance therein.

It is a twelfth object to provide for each of said cylindrical gas valve chambers an elbow in a plane normal to the spin axis of the gyroscope, each of said elbows having a hole therethrough along the axis thereof, one end of each of the elbows being adapted to form a radially adjustable plug for the outer end of one of the gas valve chambers and the other end of the elbows being adapted to form the above noted gas jets, the axis of each of the jets being in the plane of the axes of said chambers but normal to the axis of its particular gas valve chamber.

It is thirteenth object to provide the inner end of each of the above elbows with a gas outlet valve port adapted to form with its respective ball a gas valve adapted to control the gas emission from its gas valve chamber to and from the jet outlet of the elbow.

It is a fourteenth object to provide each of said gas valve chambers with a permanent closure of its inner end.

It is a fifteenth object to provide for each of said gas valve chambers on its under side a pair of radially spaced gas inlet ports communicating with said gas plenum chamber, one of each pair of ports being located radially inside the traverse of the ball in its valve chamber and the other one of each pair of ports being located radially outside the traverse of the ball.

It is a sixteenth object to provide for each of said gas valve chambers a gas outlet bleed port directed parallel to the spin axis of the gyroscope and located at the top of said chamber approximately over the radially inside inlet port of said chamber.

It is a seventeenth object to provide individual means for adjusting the resistance to gas flow of each of said bleed ports.

It is an eighteenth object to provide individual means for outwardly directing away from said spin axis the gas emitted from each of said bleed ports whereby together with said bleed port adjusting means to provide micrometric means for balancing said support to its true gravity vertical position against all of the stray forces acting to precess said spin axis away from its gravity vertical position.

It is a nineteenth object to provide a finger plate in said plenum chamber in a plane normal to the spin axis of the gyroscope and having four equally spaced fingers upstanding thereon parallel to the spin axis each one of said fingers extending from said plenum chamber into one of said valve chambers through its radially inner inlet port and adapted when said plate is raised to crowd its ball valve against its gas outlet valve port to stop the flow of gas from said valve chamber to its respective gas jet.

It is a twentieth object to provide the said finger plate with an axial operating stem and a solenoid coil surrounding said stem together with means for energizing said coil whereby when said coil is energized said plate will be lifted and all of said balls will be forced by said fingers to close said jet gas outlet ports in said valve chambers and when said coil is de-energized said plate will fall to release said balls to normal position.

How these and other objects are attained is explained in the following description of a preferred form of the invention by reference to the attached drawings in which.

Like numerals of reference refer to like parts in the several figures of the drawings.

Figure 2:
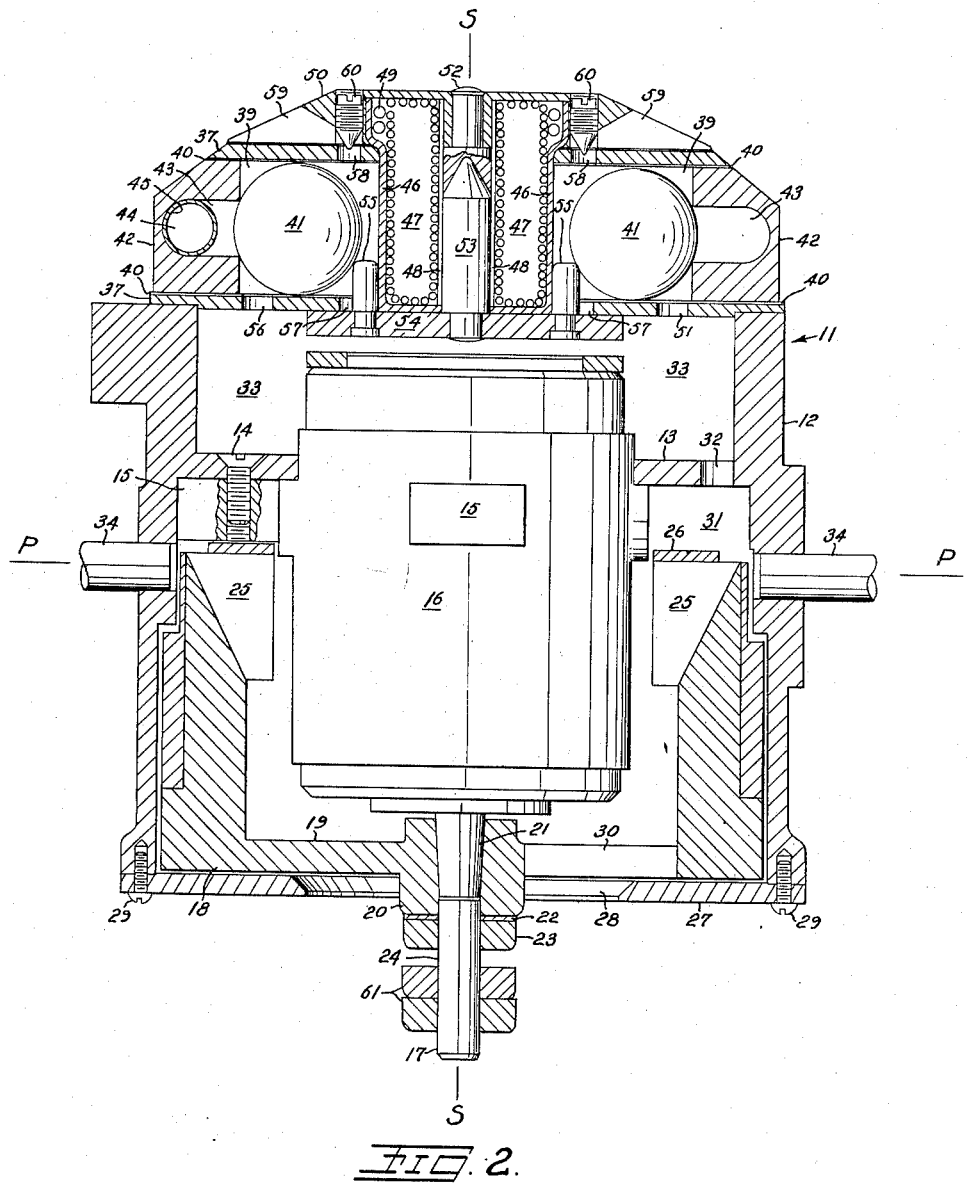
Fig. 2 is a vertical section along the line 2—2 of Fig. 1.

Referring now to Fig. 2 of the drawings there is shown generally at 11 a support or case with a hollow support body 12 having an internal annular flange 13 therein to which is secured by four equally spaced screws 14 the four equally spaced ears 15 of a gyroscope spin motor housing 16 in which is fixed a spin motor rotor (not shown) and in which is journalled a shaft 17 of an electric spin motor rotor (not shown). Since the motor is of standard construction and constitutes no novel feature of this invention the details of the motor, its slip rings, and its means of connection to a source of power are omitted for the purpose of simplifying the illustration of the novel elements of the invention.

The motor is energized to spin at high speed about a spin axis and to carry with it the cup shaped inertia element of fly wheel 18 the bottom of which is formed with four spokes 19 and a hub 20 with a tapered bore therethrough adapted to be pressed onto the tapered section 21 of motor shaft 17 and held in place by washer 22 and nut 23 threaded onto the threaded section 24 of shaft 17.

Multiple radial fan blades 25 are internally formed in flywheel 18 and have annular shroud rings 26 secured thereto.

Bottom plate 27 having a large central hole 28 therein is secured to support body 12 by screws 29.

It is seen that as the motor spins the flywheel 18 a gas pressure differential will be built up by fan blades 25 causing gas from without support body 12 to be induced into the interior space of flywheel 18 through hole 28 in plate 27 and through the inter-spoke gaps 30 in the bottom of flywheel 18. From the interior of the flywheel 18 the gas will be impelled through the interspaces of blades 25 past the outer edge of shroud ring 26 to the interspaces 31 of motor housing ears 15 and through four equally spaced annular slots 32 in flange 13 into gas plenum chamber 33.

Figure 1:
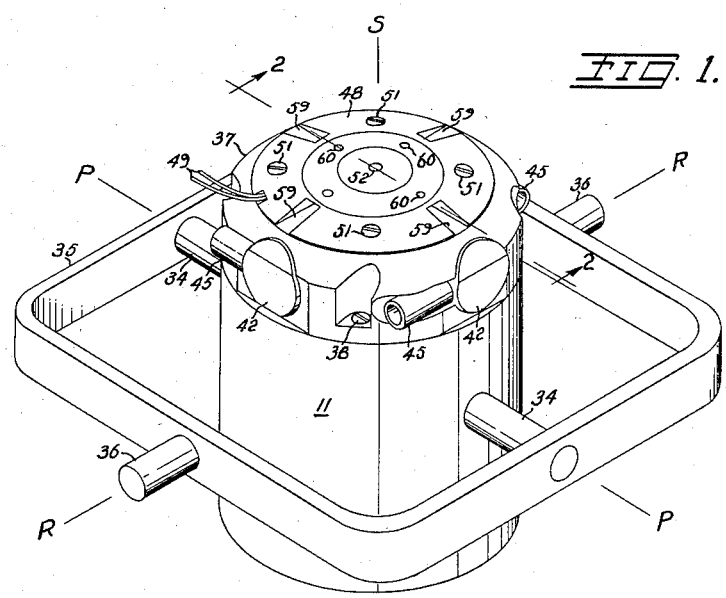
Fig. 1 is a simplified perspective view of the gyroscope showing the general location of the erecting gas jets.
Figure 3:
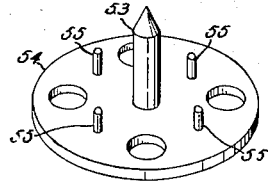
Fig. 3 is a view in perspective of the finger plate of this invention with its stem and fingers assembled thereon.
Figure 4:
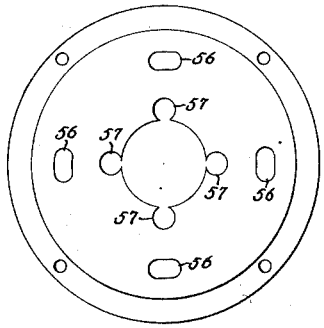
Fig. 4 is a plan view of the underside of the valve chamber block of this invention.

Referring now to Fig. 1 it is seen that support 11 carrying the spin motor and inertia element 18 spinning about the spin axis S is carried on trunnions 34 journalled in gimbal ring 35 whereby support 11 is free to rotate in either direction about the axis P of trunnions 34. Gimbal ring 35 is carried on trunnions 36 journalled in a frame (not shown) fixed in relation to the airplane on which the gyroscope is used. Gimbal ring 35 is free to rotate in either direction about the axis R of gimbal trunnions 36.

The direction of spin of the motor is clockwise looking down along the S axis.

Referring now to Fig. 1 for outside perspective and to Fig. 2 for vertical section, at 37 is shown a valve chamber block forming a cover for support body 12 to which it is secured by four equally spaced screws 38. Block 37 has four equally spaced cylindrical valve chambers 39 formed therein with the axes of the cylinders in a plane perpendicular to the spin axis S. Two of the valve chambers have their axes in a plane which includes the P axis and the S axis. The other two of the valve chambers have their axes in a plane normal to the P axes and including the S axis. Each of the chambers 39 has press fitted therein a cylindrical alloy steel liner 40 whose inner surface is highly polished and finished very closely to a specified size. Within each of the valve chambers is a hardened and highly polished steel ball 41 closely sized to the valve chamber diameter but sufficiently smaller in diameter for the ball to roll freely within the chamber at any temperature to which the mechanism might be subjected in operation. Closing the outer end of each of the valve chambers 39 is a valve plug 42 having a plane inner face and a hole 43 sunk therein on the axis of the valve chamber. The opening of hole 43 in the plane face of plug 42 forms a rest for ball valve 41. At the inner end of hole 43 in a plane normal to the spin axis, normal to the axis of hole 43 and in the direction of spin, another hole 44 is formed in plug 42 and into the outlet of hole 44 is pressed a jet orifice pipe 45.

A hole concentric with the spin axis is formed entirely through valve chamber block 37 and vertically downward through this hole is inserted closely fitting magnetic shell 46 of solenoid coil 47. Shell 46 seals valve chambers 39 against air leakage between the chambers. A non-magnetic cylindrical liner 48 lines the central hole through the solenoid 47. At its upper end shell 46 is enlarged to make room for leads 49 of solenoid coil 47 and the enlarged end of shell 46 is perforated at one side (not shown) to bring out leads 49.

Magnetic solenoid cover 50 secured to block 42 by screws 51 is hollowed out on the under side to closely fit the enlarged head of shell 46 and a central hole is formed vertically through cover 50 to receive the reduced end of magnetic stop 52 which is riveted into cover 50 as shown. The lower or larger end of stop 52 has a conical seat therein to limit the travel of solenoid stem 53 the lower reduced end of which is riveted into finger plate 54 into which is also riveted the four equally spaced valve operating fingers 55.

With the solenoid energized and with finger plate and fingers in the raised position shown in Fig. 2 valve plugs 42 are carefully pressed inwardly in valve chambers 39 until ball valves 41 just close their respective valve ports in plugs 42 and plugs 42 are there secured in place by set screws (not shown). Then when solenoid coil 47 is de-energized and finger plate 54 drops fingers 55 out of the way balls 41 have a maximum possible rolling motion along valve chambers 39 of less than one sixteenth of an inch.

Valve chamber block 42 has holes 56 and 57 formed therein along the bottom center line of each of the valve chambers 39 communicating between the plenum chamber 33 and the valve chambers 39. Valve chamber block 37 also has four holes 58 formed therein, one on the top center line of each of the valve chambers 39 communicating between the valve chamber 39 and the outside of case 11. Holes 57 are large enough so that fingers 55 do not interfere with sufficient gas flowing therethrough. Cover 50 is formed with four equally spaced outwardly directing gas slots 59 formed on its underside and extending from above the inner edge of hole 58 in block 37 to the atmosphere as shown. Concentric with holes 58 cover 50 is drilled and tapped to receive pointed throttling screws 60. It is seen that by turning screws 60 the resistance of holes 58 to gas flow therethrough can be varied with micrometer precision.

As previously described gas under pressure is supplied to plenum chamber 33. With solenoid coil 47 de-energized and the spin axis at gravity vertical position, valve balls 41 will be away from their valve seats at the entrances of holes 43 in plugs 42 and gas from plenum chamber 33 will jet through holes 56 into valve chamber 39, impinge on the under outer sides of balls 41 and leave chambers 39 through holes 43 and 44 and be jetted to atmosphere through jet orifice pipes 45.

Also gas under pressure from chamber 33 will jet through holes 57 into valve chambers 39, impinge on the inner under sides of balls 41 and leave chambers 39 through holes 58 and jet to atmosphere through slots 59.

Balancing nuts 61 are positionable on the threaded end of shaft 17 for micrometrically setting the condition of pendulosity of the gyroscope. Other adjusting nuts (not shown) are located for statically balancing the gyroscope about the R and P axes.

Should the spin axis move away from the gravity vertical position at least one of balls 41, depending on the direction of movement of the spin axis away from the gravity vertical, will react to the force of gravity and move towards its respective valve seat to throttle the gas emitted from its respective jet pipe 45 thus reducing the jet reaction force of that jet tending to rotate the support 11 about one of the axes R or P. In effect this increases the net force tending to rotate the support in the other direction about that axis and causes the support 11 to precess about the other of the axes P or R in the direction to move the spin axis S towards the gravity vertical. The direction of jet pipes 45 with respect to the direction of roll of balls 41 and the direction of spin of flywheel 18 is arranged to accomplish the required restoring movement of the spin axis towards the gravity vertical.

In the initial balancing or trimming of the gyroscope with the mechanical balance adjustment made and the solenoid de-energized so that all of the ball controlled jets are operating properly screws 60 are adjusted to balance the reactions of the air jets through slots 59 to counteract the summation of all of the other inherent and extraneous forces acting to cause the gyroscope to precess away from the gravity vertical.

It is seen that the gravitational sensitivity of the gyroscope depends on the submission of balls 41 at all times to free control by the force of gravity as they perform their throttling functions on their respective jet gas streams. It should be noted that in the present device the ball valve is only slightly smaller in diameter than the valve chamber and that the center of the ball moves only about one-fortieth of an inch either way from its mid position along the center line of the valve chamber. The air pressure in the outer end of valve chamber varies with the flow therethrough and the ball acts like a piston being forced away from its valve seat by this pressure. On the other hand the increased velocity of the gas around the ball at the valve seat edges tends to reduce the pressure on the ball at this point and suck this ball towards the seat. The present design balances these opposing forces at all times to leave the ball free of these influences. It should also be noted that at its inner side the ball also acts like a piston under the pressure of air entering the valve chamber through hole 57 and leaving through hole 58 and that by throttling screw 60 the pressure on this side of the ball is adjustable. Throttling screws 60 are therefore seen to have a trimming effect on the sensitivity of the system both by varying the pressure back of ball 41 in chamber 39 and by jet reaction of the gas emitted through slot 59.

The construction and functions of parts of our air erection system having been disclosed, described, and explained above, it should be noted that at times of great acceleration of the structure with which the gyroscope is associated it is desirable to free the gyroscope from its system of erection to the gravity vertical and to allow it to operate as a free gyroscope until the transient accelerating period is over. To free the gyroscope it is only necessary to energize solenoid coil 47 so that the magnetic path shortening effect of the magentic flux induced in the path by the energized coil will lift stem 53 and plate 54 to cause pins 55 to crowd valve balls 41 to a position of closure of the entrance of holes 43 in plugs 42. The air erection system being thus inoperative and the parts in symmetrical balance about the spin axis S the gyroscope is free. Energization of solenoid coil 47 from an external source (not shown) is accomplished by closing an external switch (not shown) in the circuit leads from the external source to the solenoid leads 49.

Although the disclosure and description and explanation of the method of operation of our gyroscope system has been limited to the illustrated structure, it is plain that the arrangement and association of parts shown will have other uses which we intend to hold for ourselves.

We claim:

1. A gyroscope including a rotor spinning about a vertical spin axis in a support, a gimbal ring in which said support is mounted freely to rotate in either direction about a support axis perpendicular to said spin axis, and a frame in which said gimbal ring is mounted freely to rotate in either direction about a ring axis perpendicular to said support axis; said gyroscope being continuously subjected to both inherent and external forces tending to cause said gyroscope to precess said spin axis away from its vertical position in any of its directions of freedom of rotation about said support axis and said ring axis; together with means forming four gas valve chambers in said support; said valve chambers being equally spaced about said spin axis with the axes of said chambers positioned radially of said spin axis in a plane perpendicular thereto; the axes of two of said valve chambers being in a plane including said spin axis and said support axis; each of said valve chambers being formed at its end away from said spin axis with a valve port therein; a gas outlet jet means communicating with each of said valve ports; gas conduit means from the exterior of said support to each of said valve chambers; each of said gas outlet jet means being axially positioned perpendicular to the axis of its valve chamber in a plane perpendicular to said spin axis; a gravity responsive valve means in each of said valve chambers; and means adapted when one of said valve means in one of said valve chambers is away from the valve port in that valve chamber to force ambient gas from outside said support through said gas conduit means to said valve chamber and from said valve chamber through said valve port to its communicating gas outlet jet means to jet said gas to the exterior of said support; whereby the reaction of said jetted gas on said support will produce a couple about one of said support or said ring axes to cause said gyroscope to process said spin axis about the other of said axes towards the gravity vertical position of said spin axis and to cause said gravity responsive valve to move towards its associated valve port.

2. The gyroscope of claim 1 in which each of said gas valve chambers is of generally cylindrical form, closed at its inner end, and closed at its outer end with an end member formed with a said valve port therein axially of said valve chamber.

3. The gyroscope of claim 2 in which said gravity responsive valve means in each one of said valve chambers comprises a metal ball having a diameter sufficiently less than the diameter of said valve chamber for said ball to be freely rollable along a portion of the length of said valve chamber and said valve port being adapted to be substantially closed by said ball when said ball is rolled into contact therewith.

4. The gyroscope of claim 2 in which the length of said cylindrical gas valve chamber is approximately equal to its diameter and in addition to said gas outlet valve port said valve chamber has two gas inlet ports and a gas outlet bleed port, said inlet ports being formed in the bottom cylindrical surface of said chamber one near each end thereof, and said bleed port being formed in the top cylindrical surface of said chamber approximately over the inner one of said inlet ports, whereby gas will be continuously injected into said valve chamber through the said inlet port near the inner end of said chamber to impinge on the underside of said ball in said chamber and leave said chamber through said bleed port, and when said ball is away from said outlet valve port gas will be continuously injected into said valve chamber through said inlet port near the outer end of said chamber to impinge on the underside of said ball in said chamber and leave said chamber through said valve port; said ball diameter being sufficiently near the diameter of said chamber to materially restrict the flow of air past said ball in said chamber.

5. The gyroscope of claim 1 in which said gas conduit means from the exterior of said support to each of said valve chambers includes a plenum chamber formed within said support, said plenum chamber being positioned symmetrically with respect to said valve chambers and adapted to equalize the entrance pressure of said gas entering said valve chambers from said plenum chamber.

6. The gyroscope of claim 1 in which said means adapted to force ambient air from outside said support through said gas conduit means includes a fan carried on said rotor to rotate therewith and fan housing means formed within said support to form a section of said gas conduit means.

7. The gyroscope of claim 1 including means carried on said support adapted to force one of said gravity responsive valve means in one of said valve chambers to substantially seal the one of said valve ports in said valve chamber whereby the passage of gas from said valve chamber to the gas outlet jet means communicating with said valve port in said valve chamber will be substantially stopped.

8. The gyroscope of claim 1 including a finger plate carried on said support symmetrically about said spin axis and movable therealong; four fingers formed on said finger plate parallel to said spin axis and equally spaced thereabout; a stem of magnetizable material secured to said finger plate and extending therefrom along said spin axis; a solenoid coil carried on said support and surrounding part of said stem; said solenoid coil including leads extending outside said support and adapted for the connection of a source of power thereto; and said solenoid on energization being adapted to magnetize said stem whereby said finger plate and said fingers will move axially of said spin axis until each of said four fingers engages one of said gravity responsive valve means and all of said valve means are moved into their closing positions with respect to the valve ports in their respective valve chambers and thereby render all of said air ejection jets inoperative.

9. The device of claim 8 in which said gyroscope is proportioned to be free and non-pendulous when said finger plate has moved to its position of closure of said valve ports by said valve means.

10. The device of claim 1 including means movably carried on said support and operable to force each of said gravity responsive valve means in said valve chambers into contact with the one of said valve ports in its respective valve chamber to stop the flow of gas through said port to its communicating gas outlet jet means.

References Cited in the file of this patent

UNITED STATES PATENTS

| | | |
|---|---|---|
| 2,036,229 | Moss | Apr. 7, 1936 |
| 2,183,939 | Moss | Dec. 19, 1939 |
| 2,292,989 | Carter | Aug. 11, 1942 |
| 2,344,112 | Rybka | Mar. 14, 1944 |
| 2,373,120 | Kenyon | Apr. 10, 1945 |
| 2,486,578 | Summers | Nov. 1, 1949 |